United States Patent
Wen et al.

(10) Patent No.: US 9,420,235 B2
(45) Date of Patent: Aug. 16, 2016

(54) MEASURING SYSTEM FOR A 3D OBJECT

(75) Inventors: Kuang-Pu Wen, Taipei (TW); Don Lin, Taipei (TW); Liang-Pin Yu, Taipei (TW)

(73) Assignee: Test Research, Inc., Taipei (TW)

( * ) Notice: Subject to any disclaimer, the term of this patent is extended or adjusted under 35 U.S.C. 154(b) by 1508 days.

(21) Appl. No.: 12/896,949

(22) Filed: Oct. 4, 2010

(65) Prior Publication Data

US 2011/0228082 A1 Sep. 22, 2011

(30) Foreign Application Priority Data

Mar. 16, 2010 (TW) ................................ 99107640 A

(51) Int. Cl.
*H04N 7/18* (2006.01)
*G01B 11/25* (2006.01)

(52) U.S. Cl.
CPC .............. *H04N 7/18* (2013.01); *G01B 11/2518* (2013.01)

(58) Field of Classification Search
None
See application file for complete search history.

(56) References Cited

U.S. PATENT DOCUMENTS

| | | | |
|---|---|---|---|
| 4,212,073 A | 7/1980 | Balasubramanian | |
| 4,641,972 A | 2/1987 | Halioua et al. | |
| 5,636,025 A | 6/1997 | Bieman et al. | |
| 5,646,733 A | 7/1997 | Bieman | |
| 5,920,735 A * | 7/1999 | Gelphman | 396/24 |
| 6,327,374 B1 | 12/2001 | Piironen et al. | |
| 6,501,554 B1 | 12/2002 | Hackney et al. | |
| 6,509,559 B1 | 1/2003 | Ulrich et al. | |
| 6,577,405 B2 | 6/2003 | Kranz et al. | |
| 6,750,899 B1 | 6/2004 | Fishbaine et al. | |
| 7,397,550 B2 | 7/2008 | Hackney et al. | |
| 7,400,413 B2 | 7/2008 | Jeon et al. | |
| 7,453,580 B2 | 11/2008 | Koh et al. | |
| 2005/0139099 A1* | 6/2005 | Fujita et al. | 101/43 |
| 2005/0272184 A1* | 12/2005 | Hiramatsu et al. | 438/149 |
| 2008/0266391 A1 | 10/2008 | Lee et al. | |
| 2009/0326730 A1* | 12/2009 | Bjeljac et al. | 700/296 |

FOREIGN PATENT DOCUMENTS

| | | |
|---|---|---|
| CN | 1510393 A | 7/2004 |
| CN | 101182990 A | 5/2008 |
| JP | 10038539 A | 2/1998 |

* cited by examiner

Primary Examiner — Kate Luo
(74) Attorney, Agent, or Firm — Alan D. Kamrath; Kamrath IP Lawfirm, P.A.

(57) ABSTRACT

A measuring system for a 3D object includes a base, a horizontal scanning device disposed on the base, a first light emitting device, a second light emitting device, an image capture device, and a control device. The first light emitting device, the second light emitting device, and the image capture device are connected to the horizontal scanning device. The control device controls the horizontal scanning device to cause planar motion relative to the base. With the control of the control device, the first light emitting device and the second light emitting device alternate in projecting a light source onto a 3D object. The image capture device includes a double-sided telecentric lens to capture a plurality of images of the 3D object when the light source is projected onto the 3D object.

16 Claims, 6 Drawing Sheets

MEASURING SYSTEM FOR A 3D OBJECT

BACKGROUND OF THE INVENTION

1. Field of the Invention

The present invention relates to a measuring system and, specifically, to a measuring system for a 3D object.

2. Description of the Related Art

Measuring a 3D object usually needs an optical system comprising a "projection device" and a "camera device". Briefly, the projection device projects light onto the 3D object to generate a pattern of shadows. The camera device takes a picture of the 3D object and photographs the pattern of shadows of the 3D object at the same time to calculate the height of the 3D object and show a 3D image.

It is more and more common to apply a 3D measurement technique to the inspection of a circuit board during the manufacturing in-line process to improve productive efficiency. Currently, one of the methods of obtaining 3D information is to project a periodic fringe pattern onto an object to be measured. By shifting the phase of the periodic fringe pattern several times, an image corresponding to different fringe pattern phases from a position can be obtained. The primary principle is illustrated as follows: A light source is passed through a grating, and the resulting fringe pattern is projected onto the object to be measured through lenses. The grating itself is moved, or the object is moved relative to the projection system, to shift the phase of the fringe pattern. Thus, the surface contour of the object to be measured can be calculated. These techniques have been disclosed. For example, they are disclosed in U.S. Pat. Nos. 4,212,073 and 4,641,972.

In the above-mentioned documents, a periodic fringe pattern is generated by a projection device composed of a light source, a sinusoidal grating, and projection lenses. The periodic fringe pattern is then projected onto the surface of a certain region of the object to be measured. The phase of the periodic fringe pattern relative to the surface of the object to be measured can be shifted by moving the grating with a mechanism. These techniques are disclosed in U.S. Pat. Nos. 5,636,025 and 7,453,580. Moreover, the phase can also be shifted by changing the relative distance between the projection device and the certain region of the object to be measured, as disclosed in U.S. Pat. Nos. 5,646,733; 6,501,554; 6,509,559; 7,397,550; and 6,750,899.

Please refer to FIG. 1, which illustrates a prior art optical system 100. The camera device 15 is a tri-linear camera. A projection system 18 generates periodic fringe patterns 16a-16c and projects the same onto an object 14 to be measured, and an image is focused onto the camera device 15. The phases of fringe patterns 16a, 16b, and 16c are different from each other. The camera device 15 comprises a plurality of linear detectors 15a, 15b, and 15c. Linear detectors 15a, 15b, and 15c are separated from each other by a distance of several pixels. The object 14 to be measured moves relative to the optical system 100 in a direction indicated by an arrow 200 to allow the phase to be shifted. The illumination area of the fringe pattern 16a can be imaged onto the linear detector 15a. When the illumination area is moved to the fringe pattern 16b that can be imaged onto the linear detector 15b, and when the illumination area is moved to the fringe pattern 16c that can be imaged onto the fringe pattern 15c, different image information of different phases of fringe patterns and different areas of the same object can be acquired. 3D information with substantially the same size as one single linear detector is then obtained accordingly. The geometric information of the object can be obtained by continuous line scanning.

However, the aforementioned technique is limited by the bandwidth of the tri-linear camera. That is, when the "camera device" operates, the minimal unit is the field of view (FOV). Because the line rate of the camera of the aforementioned technique is up to several thousand Hz, it is difficult to use a flash light source. Instead, a constant light source must be used. The consumed power of a constant light source is much greater than that of a flash light source. Also, the usage lifespan of a constant light source is shorter, and the maintenance charges of a constant light are higher.

Furthermore, U.S. Pat. No. 6,750,899 discloses another method of generating a 3D image. The system structure is illustrated in FIG. 2A. A projection system 81 comprises a flashlamp 82, a condenser 83, a grating 84, and a projector 85. A fringe pattern is generated for projection onto a board 86 to be measured and an object 87 to be measured. A camera system 88 comprises a CCD camera 89 and a camera lens 93. The resolution of the CCD is 1024×1024. A light source 97 projects a light-spot onto an intersection of the optic axis of the CCD camera 89 and the board 86 to be measured, and the CCD camera 89 takes images for calculation of the distance between the board 86 and the camera system 88 accordingly.

The movement of the board 86 is controlled by an X-Y system 95. Please also refer to FIG. 2B for another traditional system. The movement direction is indicated by an arrow 300. When the board 86 moves to a region to be measured, the light source 97 is triggered, the CCD camera 89 takes images, and the imaging distance is adjusted accordingly. As shown in FIG. 2B, the CCD camera 89 takes an image 801 first and then takes images 802, 803, and 804 in order. The displacement between two taken images is about several pixels. All images can be taken within several milliseconds. The 3D information of an overlapped area 800 can be calculated from a part of the image 802 corresponding to the overlapped area 800, a part of the image 803 corresponding to the overlapped area 800, and a part of the image 804 corresponding to the overlapped area 800.

In fact, the velocity of the traditional system while moving between different regions to be measured is different from that while images are being taken. Therefore, the traditional system has a problem of stable movement. It needs time to stabilize in a state of dynamic acceleration and deceleration. Moreover, only the overlapped parts of a plurality of images can be used for calculating 3D information. The other parts are useless. The problems mentioned above all cause a waste of the bandwidth of a camera.

Due to the issue of production costs, the density of components on a single unit of a circuit board is increasing. It thus is becoming increasingly necessary to measure a whole board under scanning-inspection to continuously improve the production capacity and the yield rate of production. Therefore, to meet market requirements, the measurement ability of the inspection device has to be good enough, and the inspection speed has to be relatively greater.

Additionally, the technique of using a telecentric lens as the projection device has been disclosed in the prior art, for example U.S. Pat. No. 6,577,405. However, in the prior art, additional hardware, such as a laser spot, has to be added in order to measure the distance of the object to be measured, and the distance between the whole set of the optical system and the object to be measured has to be changed in order to obtain clearer images. Thus, the system cannot overcome the movement limitation.

SUMMARY OF THE INVENTION

A primary objective of the present invention is to provide a measuring system for a 3D object. The system avoids the dynamic acceleration and deceleration change for movement.

Another objective of the present invention is to provide a measuring system for a 3D object. The system is able to decrease redundancy regions between images to fully utilize the bandwidth of a camera.

An additional objective of the present invention is to provide a measuring system for a 3D object that can meet the requirement of high inspection speed.

In order to achieve the above-mentioned objectives, the present invention discloses a measuring system used for measuring a 3D object. The measuring system for the 3D object comprises a base, a horizontal scanning device, a first light emitting device, a second light emitting device, an image capture device, and a control device.

The horizontal scanning device is disposed on the base. The image capture device is disposed between the first light emitting device and the second light emitting device. The first light emitting device is connected to the horizontal scanning device and is used for projecting a first light onto the 3D object. The second light emitting device is connected to the horizontal scanning device and is used for projecting a second light onto the 3D object. The image capture device is connected to the horizontal scanning device. When the first light or the second light is projected onto the 3D object, the image capture device captures a plurality of images of the 3D object.

In one embodiment, the first and second light emitting devices each use one projection lens respectively. The image capture device adopts a telecentric lens, and the telecentric lens adopts a double-sided telecentric lens.

The control device comprises a memory, a CPU, an image interface, a display screen, and an I/O unit electrically coupled to each other. The control device controls the horizontal scanning device to move horizontally relative to the base. Moreover, the measuring system for the 3D object further comprises a motor. The motor is electrically coupled to the I/O unit of the control device to drive the horizontal scanning device to move horizontally.

The control device can further control the first light emitting device and the second light emitting device such that the first light and the second light are projected onto the 3D object in alternating order.

In addition, the control device further controls the image capture device to capture the plurality of images of the 3D object when the first light or the second light is projected onto the 3D object.

DETAILED DESCRIPTION OF THE PREFERRED EMBODIMENTS

The advantages and innovative features of the invention will become more apparent from the following detailed description when taken in conjunction with the accompanying drawings.

Figure 1:
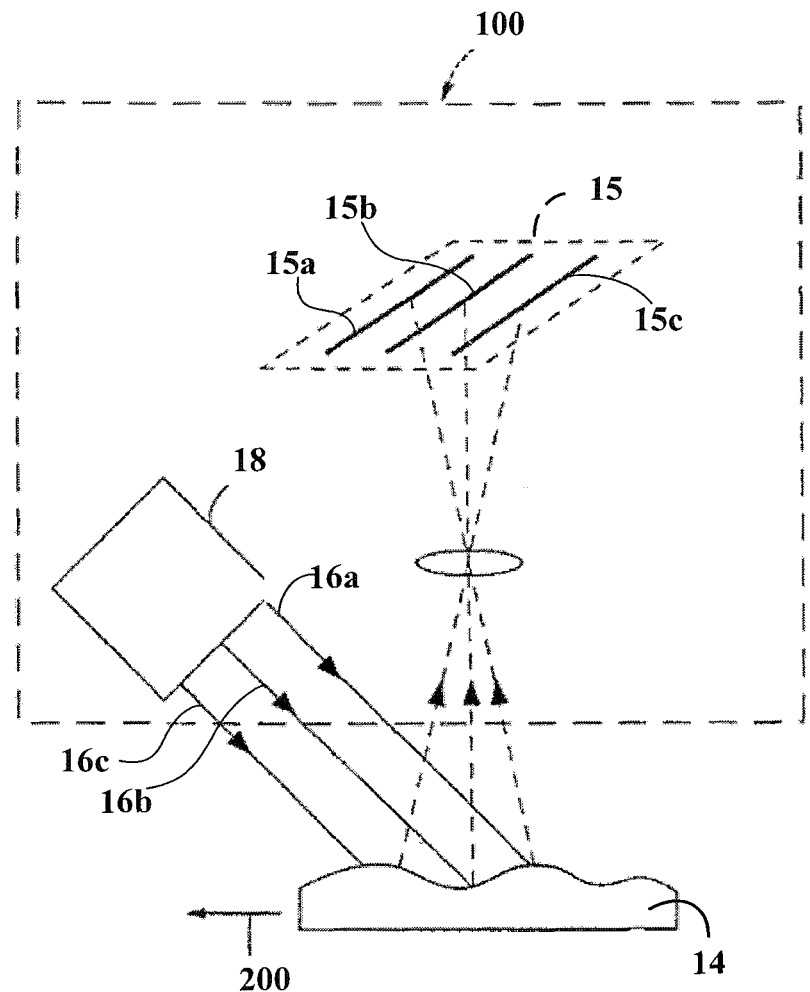
FIG. 1 is a schematic drawing of the structure of a prior art optical system.
Figure 2A:
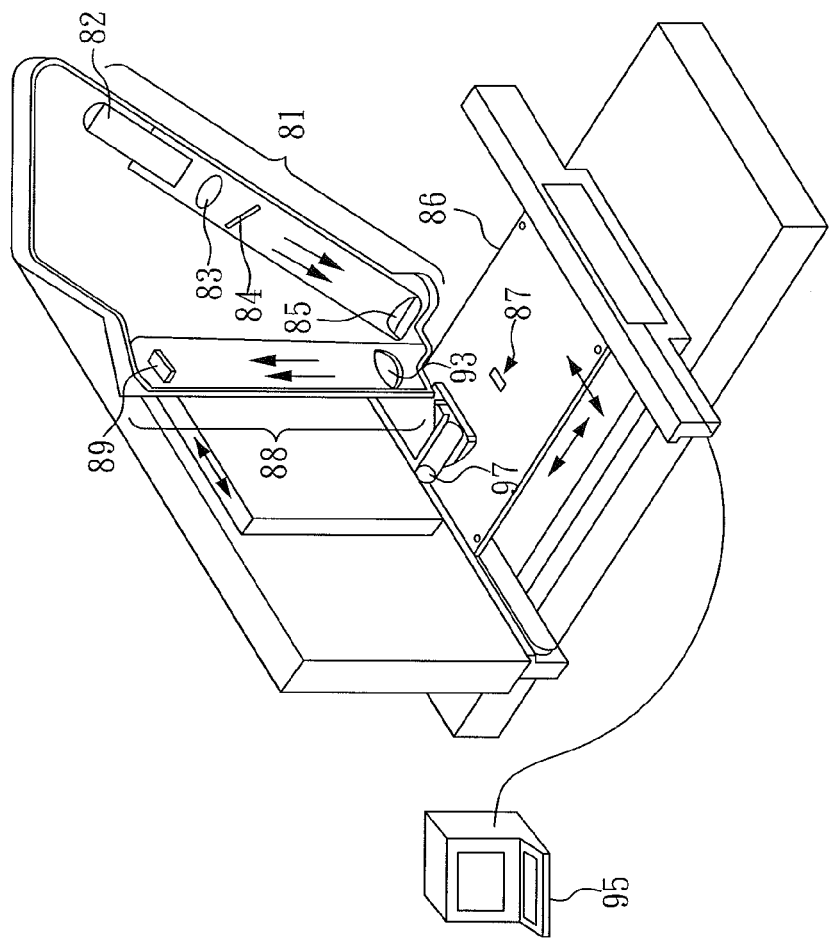
FIG. 2A is a schematic drawing of the appearance of another prior art optical system.
Figure 2B:
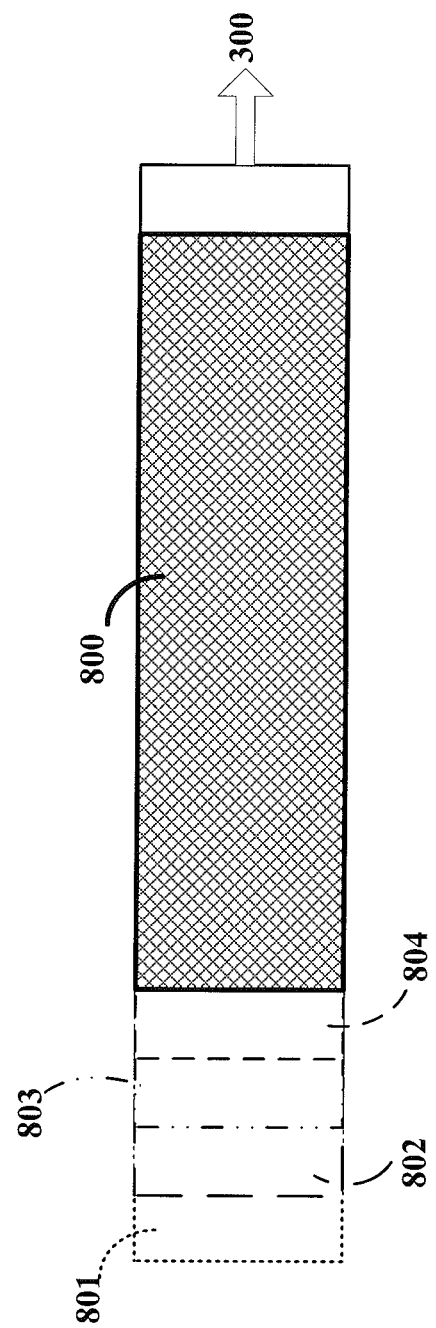
FIG. 2B is a schematic drawing of images continuously taken by the optical system shown in FIG. 2A.
Figure 3:
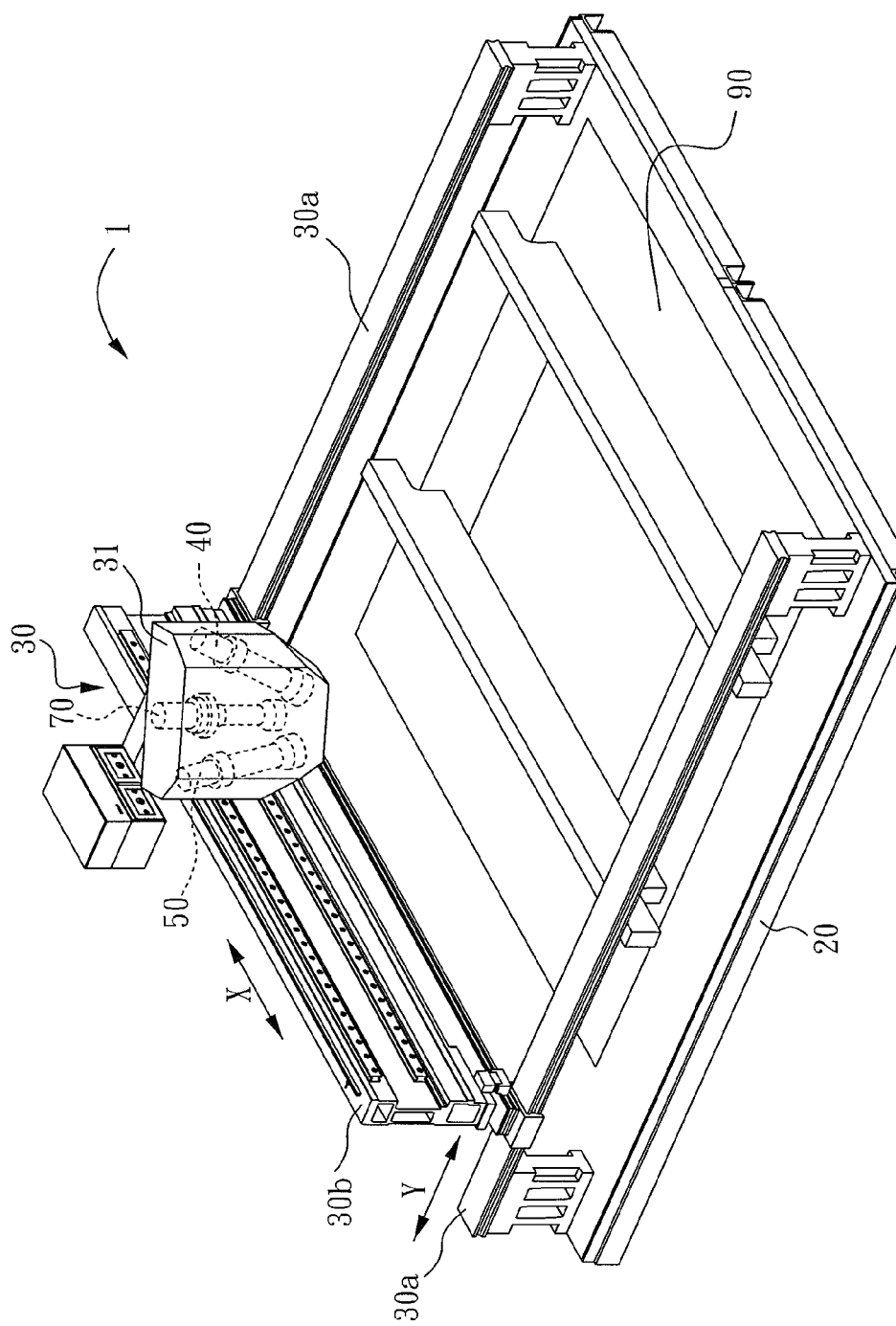
FIG. 3 is a schematic drawing of a measuring system for a 3D object in accordance with the present invention.
Figure 4:
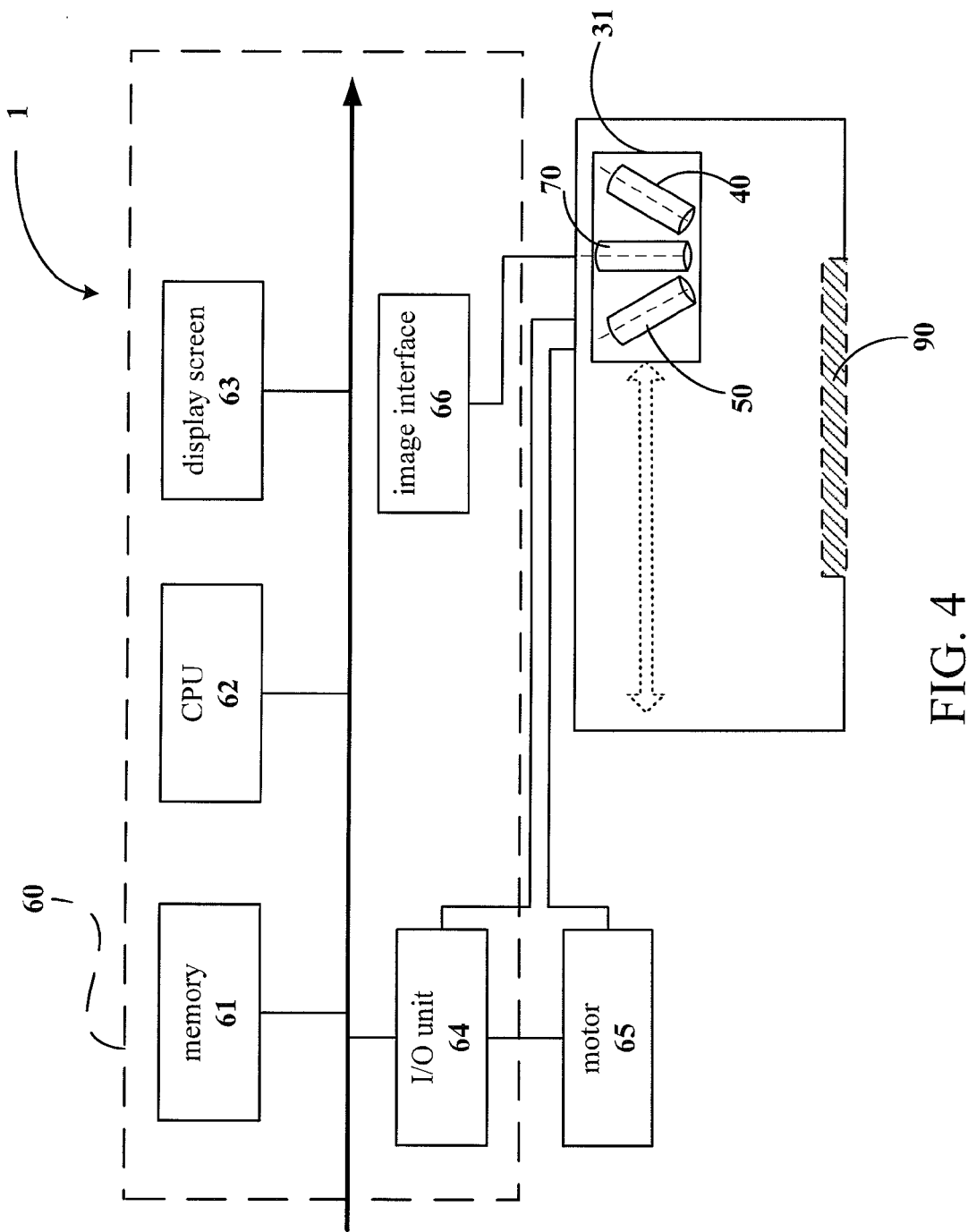
FIG. 4 is a block diagram of the measuring system for a 3D object of the present invention.

Please refer to FIG. 3 and FIG. 4. FIG. 3 is a schematic drawing of a measuring system for a 3D object of the present invention. FIG. 4 is a block diagram of the measuring system for a 3D object of the present invention. The present invention provides a measuring system 1 for measuring a 3D object 90 (e.g., a circuit board applied with solder paste). The measuring system 1 comprises a base 20, a horizontal scanning device 30, a first light emitting device 40, a second light emitting device 50, an image capture device 70, and a control device 60, which will be described in detail in FIG. 4.

The horizontal scanning device 30 is disposed on the base 20. The horizontal scanning device 30 can move horizontally relative to the base 20. In this embodiment, the horizontal scanning device 30 comprises a main body 31, an X-axis track 30b, and two Y-axis tracks 30a. The first and second light emitting devices 40, 50 and the image capture device 70 are disposed on the main body 31. The main body 31 can move along the X-axis track 30b. The X-axis track 30b is able to move along the two Y-axis tracks 30a, 30a. Briefly, the first and second light emitting devices 40, 50 and the image capture device 70 are connected to the horizontal scanning device 30 to allow the horizontal scanning device 30 to move the first and second light emitting devices 40, 50 and the image capture device 70 horizontally. Since the horizontal scanning device 30 can be a traditional device, further description is omitted for the sake of brevity.

The first light emitting device 40 is used for projecting a first light 41 onto the 3D object 90. The second light emitting device 50 is used for projecting a second light 51 onto the 3D object 90. When the first light 41 or the second light 51 is projected onto the 3D object 90, the image capture device 70 captures a plurality of images of the 3D object 90.

Figure 5:
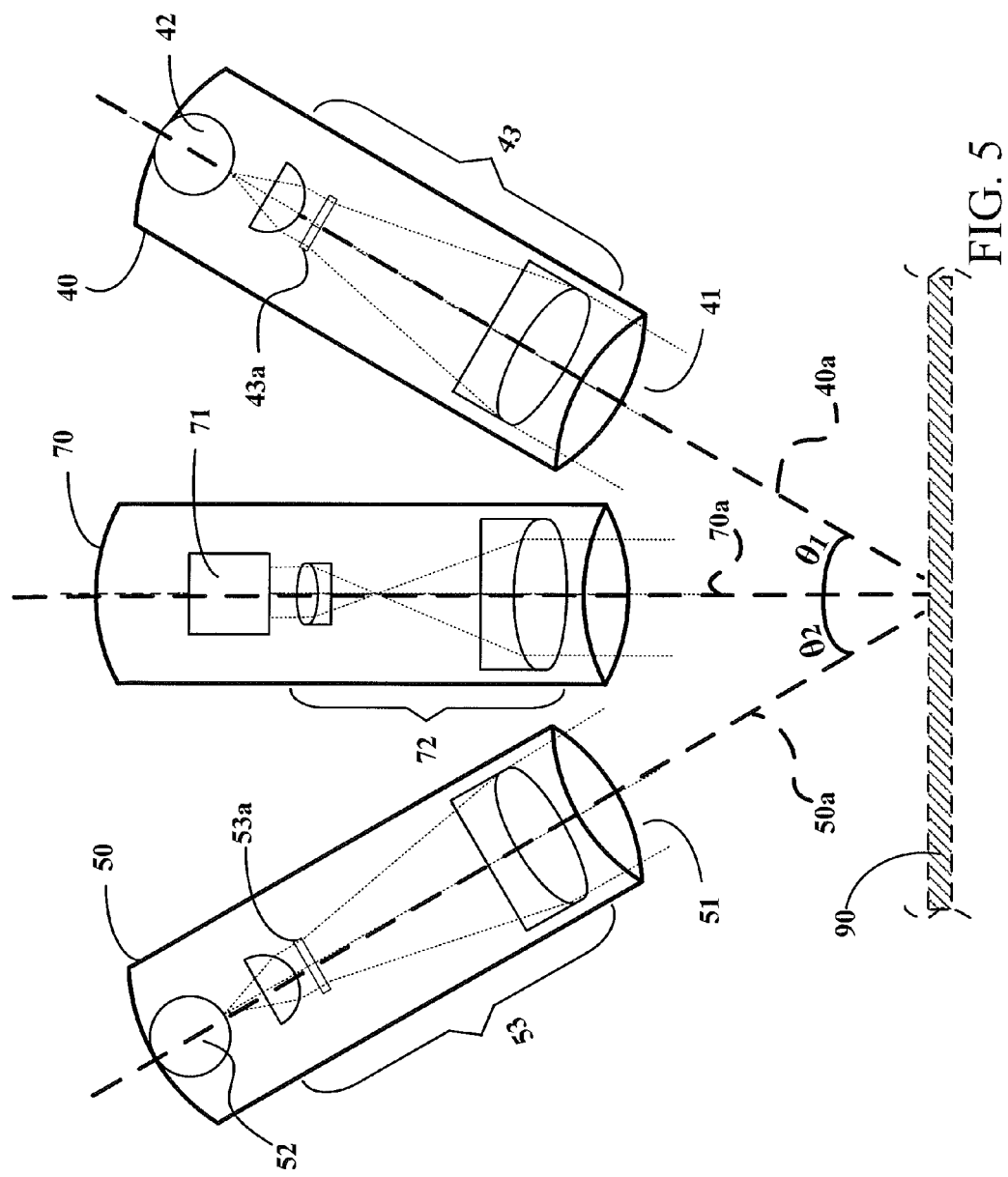
FIG. 5 is a schematic drawing of light emitting devices and an image capture device.

Please refer to FIG. 5, which is a schematic drawing of the structure of the first and second light emitting devices 40, 50 and the image capture device 70.

The first light emitting device 40 comprises a first lighting component 42 and a first lens 43. The first lighting component 42 projects a first light 41 onto the 3D object 90 through the first lens 43. Moreover, those skilled in this art would understand that the first light emitting device 40 needs a grating element 43a to project a grating onto the 3D object 90 so that the 3D surface contour of the 3D object 90 can be calculated. In this embodiment, the first lens 43 is a projection lens.

The design of the second light emitting device 50 is the same as that of the first light emitting device 40. The second light emitting device 50 comprises a second lighting component 52 and a second lens 53. The second lighting component 52 projects a second light 51 onto the 3D object 90 through the second lens 53. Moreover, those skilled in the art would understand that the second light emitting device 50 needs a grating element 53a to project a grating onto the 3D object 90 so that the 3D surface contour of the 3D object 90 can be calculated. In this embodiment, the second lens 53 is a projection lens.

The image capture device 70 is disposed between the first and second light emitting devices 40, 50. A central axis 70a of the image capture device 70 and a central axis 40a of the first light emitting device 40 form an angle θ1. A central axis 70a of the image capture device 70 and a central axis 50a of the second light emitting device 50 form an angle θ2. The angle θ1 and the angle θ2 are suggested to be between 10 to 45 degrees. The image capture device 70 mainly comprises a sensing chip module 71 and a telecentric lens 72. The telecentric lens 72 is a double-sided telecentric lens in this embodiment. Thus, there is no need to use any additional hardware to measure the dynamic distance between the 3D object 90 and the image capture device 70. With simple movement of the sensing chip module 71 of the image capture device 70 (i.e., the camera), the dynamic imaging of the 3D object 90 can be obtained clearly, and the optical imaging magnification will not change accordingly.

For example, the 3D object 90 may be a circuit board to be inspected. The circuit board is placed on the base 20. The horizontal scanning device 30 moves horizontally relative to the base 20, which causes the first light emitting device 40, the second light emitting device 50, and the image capture device 70 to be moved relative to the base 20 horizontally, such as backwards and forwards in the X direction and also in the Y direction. Thus, the circuit board on the base 20 can be measured by the measuring system 1 of the present invention in order to detect soldering errors on the circuit board, for example.

Please refer to FIG. 4. Generally, the control device 60 comprises a memory 61, a CPU 62, an image interface 66, a display screen 63, and an I/O unit 64 electrically coupled to each other. The control device 60 controls the horizontal scanning device 30 to move horizontally relative to the base 20. Moreover, the measuring system 1 further comprises a motor 65. The motor 65 is electrically coupled to the I/O unit 64 of the control device 60 to drive the horizontal scanning device 30 to move horizontally.

Memory 61 stores a software program. The CPU 62 executes the software program to carry out instructions. Thus, the control device 60 is able to control the image capture device 70 to capture images. When the first light 41 or the second light 51 is projected onto the 3D object 90, the image capture device 70 captures a plurality of images of the 3D object 90. The plurality of images is then shown on the display screen 63 through the image interface 66.

In addition, the control device 60 can further control the first light emitting device 40 and the second light emitting device 50 such that the first light 41 and the second light 51 are projected onto the 3D object 90 in an alternating pattern. For example, the control device 60 controls the first light 41 and the second light 51 to be alternately projected with a frequency of 2 Hz~1000 Hz. With constant-velocity area progressive scanning, there is no change of dynamic acceleration and deceleration during the time of image taking, and redundant regions between images can be decreased (only at both ends requiring overlapped scanning) in order to fully utilize the bandwidth of the image capture device (e.g., a camera), to meet the requirement of higher inspection speed.

Because taking images in the present invention employs a "double-sided telecentric lens", there is no need to use additional hardware to measure the distance between the object and the device. With simple movement of the sensing chip module of the image capture device (the camera), the 3D object can be obtained clearly, and the optical imaging magnification will not change.

As mentioned above, the inspection technique and system of the present invention can avoid the change of dynamic acceleration and deceleration and can also decrease redundant regions between images to fully utilize the bandwidth of the image capture device (e.g., a camera), to meet the requirement of high inspection speed.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A measuring system used for measuring a 3D object comprising:
   a base;
   a horizontal scanning device disposed on the base;
   a first light emitting device connected to the horizontal scanning device, with the first light emitting device comprising a first lighting component and a first lens, wherein the first lighting component projects a first light onto the 3D object through the first lens;
   a second light emitting device connected to the horizontal scanning device, with the second light emitting device comprising a second lighting component and a second lens, wherein the second lighting component projects a second light onto the 3D object through the second lens;
   an image capture device connected to the horizontal scanning device, with the image capture device capturing a plurality of images of the 3D object when the first light or the second light is projected onto the 3D object, wherein the image capture device is disposed between the first light emitting device and the second light emitting device, wherein the image capture device comprises a sensing chip module and a telecentric lens; and
   a control device
      controlling the horizontal scanning device to move horizontally relative to the base with a constant-speed area scanning;
      controlling the first light emitting device and the second light emitting device with the first light and the second light projected onto the 3D object in an alternating pattern; and
      controlling the image capture device to capture the plurality of images of the 3D object when the first light or the second light is projected onto the 3D object and the horizontal scanning device is on the constant-speed area scanning.

2. The measuring system as claimed in claim 1, wherein the telecentric lens is a double-sided telecentric lens.

3. The measuring system as claimed in claim 2, wherein the first lens and the second lens are both projection lenses.

4. The measuring system for a 3D object as claimed in claim 3, wherein a central axis of the first light emitting device makes an angle with a central axis of the image capture device, and the angle is 10~45 degrees.

5. The measuring system for a 3D object as claimed in claim 4, wherein a central axis of the second light emitting device makes an angle with the central axis of the image capture device, and the angle is 10~45 degrees.

6. The measuring system for a 3D object as claimed in claim 5, wherein the first light and the second light are projected onto the 3D object in the alternating pattern with a frequency of 2 Hz~1000 Hz.

7. The measuring system as claimed in claim 6, wherein the horizontal scanning device further comprises a main body, and wherein the first and second light emitting devices and the image capture device are disposed in the main body.

8. The measuring system as claimed in claim 7, wherein the horizontal scanning device further comprises an X-axis track and two Y-axis tracks, wherein the main body moves along the X-axis track, and wherein the X-axis track moves along the two Y-axis tracks.

9. The measuring system for as claimed in claim 6, wherein the moving of the horizontal scanning device relative to the base is substantially a uniform motion.

10. The measuring system as claimed in claim 1, wherein the first lens and the second lens are both projection lenses.

11. The measuring system for a 3D object as claimed in claim 1, wherein a central axis of the first light emitting device makes an angle with a central axis of the image capture device, and the angle is 10~45 degrees.

12. The measuring system for a 3D object as claimed in claim 1, wherein a central axis of the second light emitting device makes an angle with the central axis of the image capture device, and the angle is 10~45 degrees.

13. The measuring system for a 3D object as claimed in claim 1, wherein the first light and the second light are projected onto the 3D object in the alternating pattern with a frequency of 2 Hz~1000 Hz.

14. The measuring system as claimed in claim 1, wherein the horizontal scanning device further comprises a main body, and wherein the first and second light emitting devices and the image capture device are disposed in the main body.

15. The measuring system as claimed in claim 1, wherein the horizontal scanning device further comprises an X-axis track and two Y-axis tracks, wherein the main body moves along the X-axis track, and wherein the X-axis track moves along the two Y-axis tracks.

16. The measuring system for as claimed in claim 1, wherein the moving of the horizontal scanning device relative to the base is substantially a uniform motion.

* * * * *